United States Patent
Sundaresan et al.

(10) Patent No.: US 11,640,456 B1
(45) Date of Patent: May 2, 2023

(54) SYSTEM AND METHOD FOR AUTHENTICATING A USER AT A USER APPLICATION USING AN CREDENTIAL ACCESS APPLICATION AND AUTOMATICALLY REDIRECTING TO A TARGET APPLICATION

(71) Applicant: Workday, Inc., Pleasanton, CA (US)

(72) Inventors: Prakash Sundaresan, Redmond, WA (US); Aneesh Sandeep Verenkar, San Jose, CA (US); Lionello G. Lunesu, Peng Chau (HK); Krishnan Rajiyah, El Dorado Hills, CA (US); Kamalanathan Thandapani, Livermore, CA (US); Keith Kowal, Pleasanton, CA (US); Amit Jasuja, Pleasanton, CA (US)

(73) Assignee: Workday, Inc., Pleasanton, CA (US)

( * ) Notice: Subject to any disclaimer, the term of this patent is extended or adjusted under 35 U.S.C. 154(b) by 406 days.

(21) Appl. No.: 16/854,474

(22) Filed: Apr. 21, 2020

Related U.S. Application Data

(60) Provisional application No. 62/839,370, filed on Apr. 26, 2019.

(51) Int. Cl.
*G06F 21/45* (2013.01)
*H04L 9/32* (2006.01)
*G06F 21/32* (2013.01)

(52) U.S. Cl.
CPC .............. *G06F 21/45* (2013.01); *G06F 21/32* (2013.01); *H04L 9/3231* (2013.01)

(58) Field of Classification Search
None
See application file for complete search history.

(56) References Cited

U.S. PATENT DOCUMENTS

| | | | |
|---|---|---|---|
| 2012/0324242 A1* | 12/2012 | Kirsch | G06F 21/6245 713/189 |
| 2015/0180863 A1 | 6/2015 | Kobayashi | |
| 2015/0365348 A1 | 12/2015 | Matsuda | |
| 2018/0040064 A1 | 2/2018 | Grigg | |
| 2018/0145967 A1* | 5/2018 | Matsugashita | G06F 21/335 |
| 2019/0050551 A1* | 2/2019 | Goldman-Kirst | G06F 21/335 |
| 2019/0069168 A1 | 2/2019 | Belote | |
| 2019/0260836 A1* | 8/2019 | Zahl | H04L 63/101 |
| 2020/0314205 A1 | 10/2020 | Cheng | |

* cited by examiner

*Primary Examiner* — Nelson S. Giddins
(74) *Attorney, Agent, or Firm* — Van Pelt, Yi & James LLP

(57) ABSTRACT

A credential accessing system includes an interface and a processor. The interface is configured to receive a request to access a credential using a credential access application. The processor is configured to execute the credential access application in response to a request from a user application, wherein the request from the user application comprises an indication of a target application. Executing the credential access application comprises:1) receiving an indication of interactive control, wherein interactive control is redirected from the user application, and wherein the indication of interactive control comprises the indication to access the credential; 2) determine whether to allow access to the credential; and 3) in response to determining to allow access to the credential, access the credential and provide the credential to the target application; and 4) indicate to redirect interactive control to the target application.

17 Claims, 10 Drawing Sheets

| User Application | Call Back URLs | Application Links |
|---|---|---|
| First Application Type | Call_Back_URL 1 | First Application Link |
| Second Application Type | Call_Back_URL 2 | Second Application Link |

FIG. 4

SYSTEM AND METHOD FOR AUTHENTICATING A USER AT A USER APPLICATION USING AN CREDENTIAL ACCESS APPLICATION AND AUTOMATICALLY REDIRECTING TO A TARGET APPLICATION

This application claims priority to U.S. Provisional Patent Application No. 62/839,370 entitled SYSTEM AND METHOD FOR AUTHENTICATING A USER AT A RELYING PARTY APPLICATION USING AN AUTHENTICATION APPLICATION AND AUTOMATICALLY REDIRECTING TO A TARGET APPLICATION filed Apr. 26, 2019 which is incorporated herein by reference for all purposes.

BACKGROUND OF THE INVENTION

Mobile applications require user authentication to enable users to access them, which is typically done using credentials—for example, a username and password. Since it is cumbersome for users to create credentials for each application, many applications rely on user credentials from a third-party application for authentication, in order to make it easier for the user to avoid having to create a new set of credentials. These applications are called user applications. These user credentials may be stored as cookies in a browser and can be retrieved and used by each user application to automatically login to a corresponding mobile application. However, there is a risk these cookies can be accessed by malware in order to access the user application and perform unauthorized transactions on the corresponding mobile application improperly accessed with the user application.

One way to reduce this risk to use a separate application for authentication, such as a Digital Identity Wallet application or a third-party application (e.g., Facebook). When the user initiates an authentication or authorization request from a user application, it may be received in the other application that is used to authenticate the user, typically using a notification system. After the user inspects and confirms the request, usually the user has to manually switch back to the original user application to continue. This is an extra step that represents friction (inefficiency) for the user. Accordingly, there remains need for a system and method for authenticating the user that has fewer steps, without compromising on security.

BRIEF DESCRIPTION OF THE DRAWINGS

Various embodiments of the invention are disclosed in the following detailed description and the accompanying drawings.

FIG. 4 is a diagram illustrating an embodiment of a table 400 having application links 406 that correspond to call back URLs 404 for application types.

DETAILED DESCRIPTION

Figure 1:
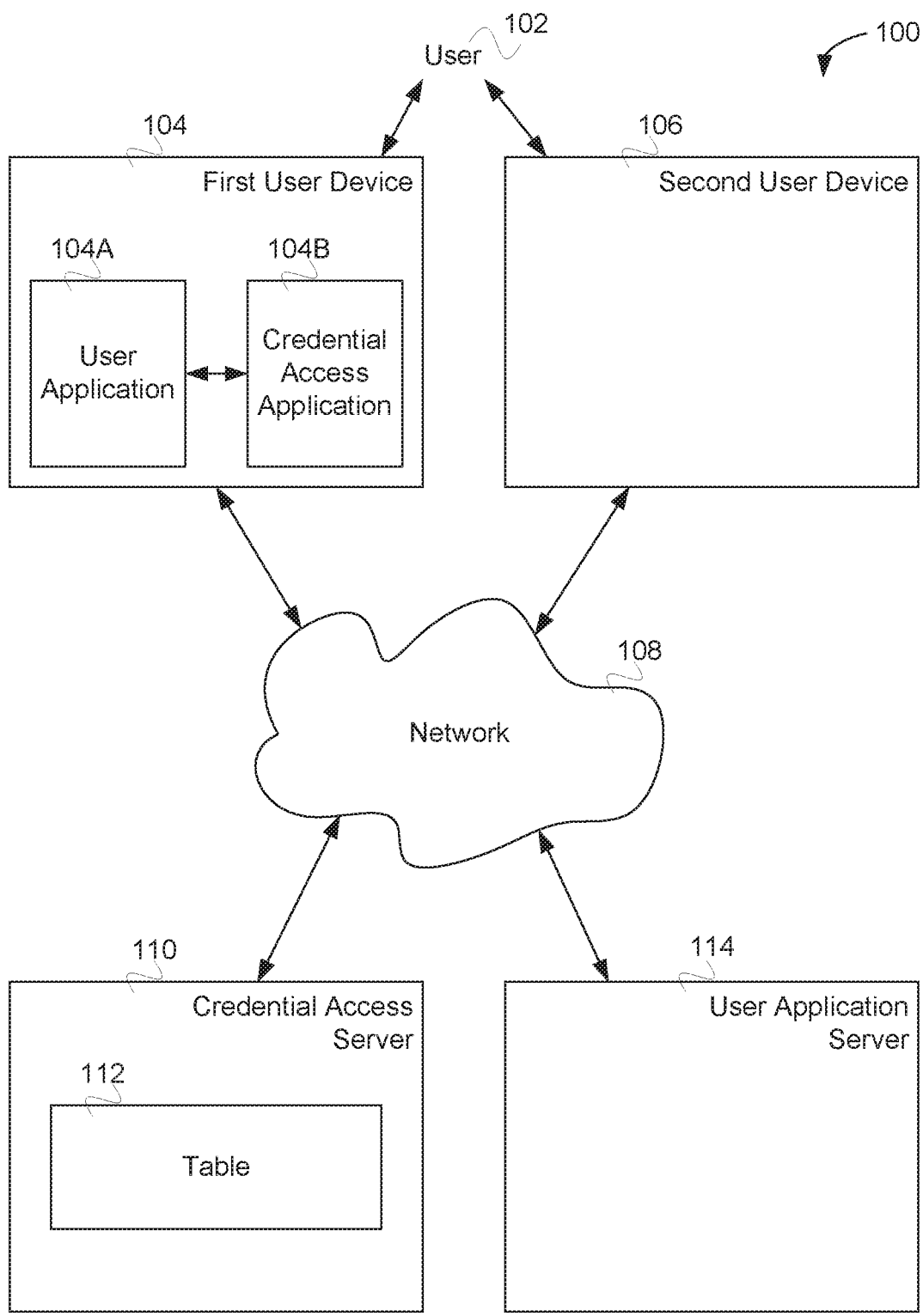
FIG. 1 is a block diagram 100 illustrating an embodiment of a system that authenticates a user 102 to a user application 104A using a credential access application 104B in a first user device 104.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments.

A credential accessing system is disclosed. The system includes an interface and a processor. The interface is configured to receive a request to access a credential using a credential access application. The processor is configured to execute the credential access application in response to a request from a user application, wherein the request from the user application comprises an indication of a target application. Executing the credential access application comprises: 1) receiving an indication of interactive control, wherein interactive control is redirected from the user application, and wherein the indication of interactive control comprises the indication to access the credential; 2) determine whether to allow access to the credential; and 3) in response to determining to allowing access to the credential, access the credential and provide the credential to the target application; and 4) indicate to redirect interactive control to the target application.

There remains a need for a system and method for authenticating a user to a user application that has fewer steps, without compromising on security. Referring now to the drawings, and more particularly to FIGS. 1 through 9, preferred embodiments are shown, where similar reference characters denote corresponding features consistently throughout the figures.

FIG. 1 is a block diagram 100 illustrating an embodiment of a system that authenticates a user 102 to a user application 104A using a credential access application 104B in a first user device 104 according to some embodiments herein. The block diagram 100 includes the user 102, the first user device 104, a second user device 106, a network 108, a credential access application server 110 and a user application server 114. The first user device 104, without limitation, may be a mobile device that includes a cryptographic processor. The first user device 104, without limitation, may be selected from a mobile phone, a Personal Digital Assistant (PDA), a tablet, a desktop computer, or a laptop. The second user device 106 is an electronic device that can access a user service via a browser. The second user device 106, without limitation, may be selected from a mobile phone, a Personal Digital Assistant (PDA), a tablet, a desktop computer, or a laptop. The first user device 104 may include one or more user applications and one or more authentication applications. The credential access application 104B may be any application that the user 102 has already registered his/her credentials with. The user application 104A may be any application that permits user authentication based on credentials that are registered with the credential access application 104B. In some embodiments, the credential access application 104B is a Digital Identity Management (DIM) application. The credential access application 104B may be embedded in a third-party application (e.g., Facebook, Gmail, Twitter, etc.) Credential access application server 110 comprises an application server for communicating with credential access application 104B, storing data for credential access application 104B, etc. In some embodiments, credential access application server 110 comprises table 112.

In some embodiments, the user application 104A specifies an application link that specifies a custom Uniform Resource Locator (URL) scheme (e.g., iOS Universal Links or Android Deep Links) that send the user 102 directly to an application (e.g., Facebook, Twitter) instead of a website or a store if the application is already installed in the first user device 104. The application link may match one or more web pages to one or more in-app locations. In some embodiments, the application link is at least one of: (i) an iOS Universal Link or (ii) an Android Deep Link. In some embodiments, when the user 102 opens a web page with the first user device 104 which is matched as described, iOS automatically redirects the user 102 to the application. In some embodiments, the Android Deep Link is based on website URL that has been verified to belong to a website. In some embodiments, the Android Deep Link opens the application when the user 102 clicks the URL.

In some embodiments, the user application 104A specifies a callback URL that specifies a URL of an application that is designated to receive an authorization code on behalf of a user application. In some embodiments, the call back URL notifies the user application of the result of the authentication or authorization request (e.g. success/failure), and in the case of success, any requested identity credentials are also returned to the call-back URL.

The user application 104A specifies the application link (e.g., a first application link or a second application link) that corresponds to the call back URL (e.g., a first call back URL, a second call back URL or a third call back URL) and registers the application link that corresponds to the call back URL in a table 112 accessible to the credential access application 104B. In some embodiments, the credential access application 104B stores the table 112 at the credential access application server 110, however, the table 112 can be stored at the first user device 104. In some embodiments, the user application 104A specifies the application link in a communication directly to credential access application 104B (e.g., as part of an API call).

In some embodiments, the user application 104A specifies at least one of the first application link that corresponds to the first call back URL and the second application link that corresponds to the second call back URL. In some embodiments, the first application link is the iOS Universal Link for an iOS application, and the second application link is an Android Deep Link for an Android application. In some embodiments, the user application 104A registers the first application link that corresponds to the first call back URL and the second application link that corresponds to the second call back URL in the table 112 accessible to the credential access application 104B. The target application may a second application associated with the user application 104A or may be another third-party application. In one example, the user application 104A may be travel application like Expedia, and the first application type may be a payment application that enables the user 102 to make payment for booking rooms in Expedia. Expedia.com is a travel booking website.

In some embodiments, the user application 104A specifies a null value that corresponds to the third call back URL and registers the null value that corresponds to the third call back URL in the table 112. In some embodiments, the third call back URL. When the user 102 accesses the user application 104A from the browser (e.g., Google Chrome, Mozilla Firefox, Internet explorer, Microsoft Edge, etc.) in: (i) the first user device 104 associated with the user 102, e.g., a mobile phone with the cryptographic processor or (ii) the second user device 106 associated with the user 102 (e.g., a Personal Computer) the null value corresponding to the third call back URL is retrieved, and hence the credential access application 104B does not have to redirect to any other application. The user application 104A creates a 1-1 mapping for each application link and the corresponding call back URL. In some embodiments, the user application 104A creates the 1-1 mapping for the call back URL and the corresponding application link. In some embodiments, the table 112 includes one or more call back URLs that corresponds to one or more application links. In some embodiments, the table 112 includes the one or more application links that corresponds to the one or more call back URLs.

The user 102 may login to the user application 104A (e.g., Expedia) using at least one of (i) a username and a password or (ii) the credential access application 104B which may be the Digital Identity Management (DIM) application or the third-party application (e.g., Facebook, Gmail, Twitter, etc.) at the first user device 104. The user 102 may click the credential access application 104B (e.g., the Digital Identity Management (DIM) application) to access the user application 104A. The user application server 114 conditionally verifies the username and the password that is obtained from the user 102 with a previously registered username and a password that are stored in the user application server 114 if the user 102 logs the user application 104A using the username and the password.

In some embodiments, the user 102 initiates credential access request at the user application 104A (e.g., Expedia). In some embodiments, allowing access to the credential includes validating or login credentials of the user 102 such as a User Name/User Identification (User ID) and a password to verify an identity of the user 102. In some embodiments, the credential access application server 110 or the user application server 114 allows access to the user 102 by verifying the credentials of the user 102. For example, commercial websites such as Amazon.com may require the user 102 to login before buying products so they know exactly who their purchasers are.

In some embodiments, the allowing access to the credential enables the user 102 to access resources such as information, files, databases, funds, or locations, when the credential access application server 110 or the user application server 114 allows access to the credential for the user 102. For example, students may be required to authenticate before accessing a Student Link. The authorization step enables them to access only resources they are authorized to access, and prevents the students from seeing data of other students.

In some embodiments, the user application 104A specifies the credential access request in an application programming interface (API) call. The user application 104A makes the API call that includes: (i) at least one request for credential that corresponds to the credential access request from the user 102 at the user application 104A and (ii) the call back URL (e.g., the first call back URL, the second call back URL, or the third call back URL) that is specified by the user application 104A. In some alternative embodiments, the user application 104A makes the API call based on an authentication protocol layered on an authorization protocol. In some embodiments, the authentication protocol is an OpenID Connect protocol and the authorization protocol is an OAuth 2.0 protocol supported by the OpenID Foundation. OpenID Connect is a simple identity layer on top of the OAuth 2.0 protocol, which allows computing clients to verify an identity of the user 102 based on determining whether to allow access to a credential by the credential access application server 110, as well as to obtain basic profile information about the user 102 in an interoperable and Representational State Transfer-like (REST-like) manner. The OpenID Connect specifies a Representational State Transfer-ful (RESTful) HyperText Transfer Protocol Application Programming Interface (HTTP API), using JavaScript Object Notation (JSON) as a data format.

In some embodiments, an open authorization (OAuth) enables the user 102 to access other websites (e.g., Expedia.com) using an account of the user 102 in the HTTP service (e.g., Google, Facebook, Microsoft, or Twitter) without sharing credentials of the user 102. In some embodiments, the authorization protocol includes the call back URL (e.g., the first call back URL, the second call back URL, or the third call back URL) and at least one parameter. In some embodiments, the at least one parameter is selected from (i) an API authorization endpoint, (ii) a client ID, (iii) a response type and (iv) a scope.

An example Open Authorization (OAuth) specification of the user application 104A is:
https://cloud.trustedkey.com/v1/oauth/authorize?response_type=code&client_id=CLIEN TID&redirect_uri=CALLBACK_URL&scope=read.

Another example Open Authorization (OAuth) specification of the user application 104A is:
https://cloud.digitalocean.com/v1/oauth/authorize?response_type=code&client_id=CLIENT_ID& redirect_uri=CALLBACK_URL&scope=read.

In some embodiments, https://cloud.trustedkey.com/v1/oauth/authorize, specifies the application programming interface (API) authorization endpoint. In some embodiments, an endpoint is the uniform resource locator (URL) on a web server. In some embodiments, the endpoint may be an authorization endpoint, a token endpoint and/or a redirection endpoint. The authorization endpoint is the endpoint on an authorization server where a resource owner logs in and grants authorization to a user application. The authorization endpoint may be used to request tokens or authorization codes via the browser. The token endpoint is the endpoint on the authorization server where the user application exchanges the authorization code, client ID and client secret, for an access token. The token endpoint may be used to programmatically request the tokens. The redirect endpoint is the endpoint in the user application where the resource owner is redirected to, after having granted authorization at the authorization endpoint. In some embodiments, the authorization endpoint and the token endpoint are located on the authorization server.

The client ID specifies how the API identifies the client application. A redirect_uri=CALLBACK_URL is where the credential access application 104B is where the results of the credential access request are posted after access to a credential is granted. For example, the call-back URL is used to notify the user application of the result of the authentication or authorization request (e.g. success/failure), and in the case of success, any requested identity credentials are also returned to the call-back URL. The response_type=code specifies that the user application is requesting access to a credential. The scope=read specifies level of access that the application is requesting.

An example pseudo code for the user application 104A:
If (need_to_switch_back_to_RP_app)// e.g., calling from iOS or Android app{
//supply appropriate call-back URL so DIW can switch back to correct RP app If (iOS)
OAuth_call (params, call_back URL2); Else if (Android)
OAuth_call (params, call_back_URL3);}
Else// e.g., calling from desktop browser{
OAuth_call (params, call_back_URL1);
}

The credential access application 104B retrieves at least one of: (i) the target application link; or (ii) the null value from the table 112 that is stored in the credential access application server 110. The target application link or the null value corresponds to the call back URL. In some embodiments, the target application link is the application link that corresponds to the user application 104A.

In some embodiments, the credential access application server 110 receives the API call that includes the request to access a credential from the user application 104A. The credential access application server 110 verifies if the user 102 has sent the request by sending the at least one credential access request to the user 102 at the credential access application 104B (e.g., the Digital Identity Management (DIM) application) through the network 108. In some embodiments, the network 108 is a wired network. In some embodiments, the network 108 is a wireless network.

In some embodiments, the credential access application 104B (e.g., the Digital Identity Management (DIM) application) displays the at least one request for credential received from the credential access application server 110 at a corresponding account of the user 102 which is previously created or registered by the user 102 in the credential access application 104B.

The user 102 may approve or deny the at least one credential request at the credential access application 104B (e.g., the Digital Identity Management (DIM) application). The credential access application 104B includes a first set of credentials that includes a public-private key pair associated with the user 102. In some embodiments, the first user device 104 includes the cryptographic processor that generates the first set of credentials. The public-private key pair includes a user public key and a user private key. In some embodiments, a number of bits, e.g., 256 bits in the user public key and 256 bits in the user private key may be based on an algorithm used in the cryptographic processor of the first user device 104. In some embodiments, the user private key is restricted to the cryptographic processor on the first user device 104.

In some embodiments, access to a credential is enabled using a private key. In various embodiments, the private key is used to decrypt a stored credential or to access a stored credential.

The credential access application 104B verifies at least one of a biometric or a Personal Identification Number (PIN) code by comparing the at least one of the biometric or the PIN code with at least one of a previously registered biometric associated with the user 102 or a previously registered PIN code associated with the user 102 that is stored in the credential access application server 110, and if the at least one of the biometric or the PIN code matches the at least one of the previously registered biometric associated with the user 102 or the previously registered PIN code associated with the user 102, the user private key is made available for executing at least one cryptographic operation. In some embodiments, the biometric of the user 102 may include: (i) a fingerprint scan of the user 102; (ii) a facial feature scan of the user 102; (iii) an iris scan of the user 102; and/or a retina scan of the user 102.

In some embodiments, the credential access application 104B and at least one of the user application 104A or the browser display a unique code and details of a relying party to the user 102 to ensure that only the user 102 only responds to an authentication or the authorization request initiated by the user 102.

In one example embodiment, when the user 102 logs on to the user application 104A using the third-party application (e.g., Facebook) the user application 104A (e.g., Expedia) makes the API call that includes the authentication request to a third-party application server. In some embodiments, the third-party application server sends a verification notification to a corresponding account of the user 102 at the third-party application (e.g., Facebook account of the user 102). The user 102 may accept the verification notification by logging in to the corresponding third-party application, using the username and the password or the user 102. In some embodiments, the third-party application server (e.g., Facebook) may verify the username and the password that is obtained from the user 102 with a previously registered username and a password that are stored in the third-party application server.

The credential access application 104B conditionally authenticates the user 102 at the user application 104A based on the credential. The credential access application 104B conditionally invokes the application link from the table 112 to automatically redirect from the credential access application 104B (e.g., Expedia) to the target application specified—for example, the user application 104A in the target application link.

In some embodiments, the credential access application 104B may not redirect or switch back to the user application 104A if the user application 104A is being accessed from the browser in at least one of (i) the first user device 104 associated with the user 102 or (ii) the second user device 106 associated with the user 102. In some embodiments, the credential access application 104B may not redirect or switch back to the user application 104A if the user application 104A is being accessed from the second user device 106 associated with the user 102.

An example pseudo code for the credential access application 104B is: . . . //complete OAuth authentication/authorization processing Application_Link al=lookup_UL_Table (OAuth_call_back_URL) If (al !=NULL)

Invoke (al)//switch back to app represented by Application Link al

//else no need to switch back

Figure 2:
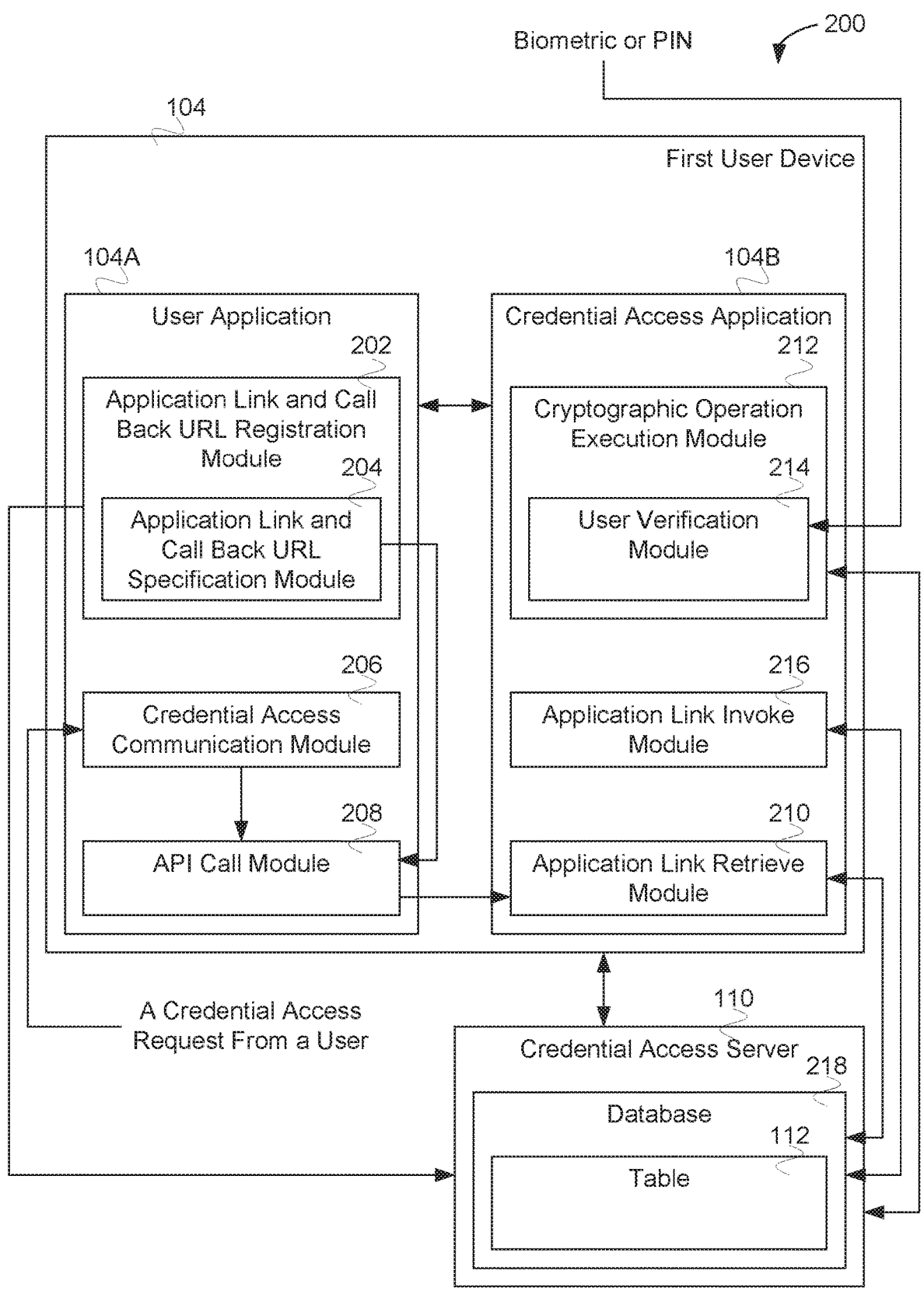
FIG. 2 is a block diagram 200 illustrating an embodiment of the first user device 104.

FIG. 2 is a block diagram 200 illustrating an embodiment of the first user device 104 according to some embodiments herein. The first user device 104 includes the user application 104A and the credential access application 104B. The user application 104A includes an application link and call back URL registration module 202, an credential access communication module 206 and an API call module 208. The application link and call back URL registration module 202 includes an application link and call back URL specification module 204. The credential access application 104B includes an application link retrieve module 210, a cryptographic operation execution module 212, and an application link invoke module 216. The cryptographic operation execution module 212 includes a user verification module 214.

The application link and call back URL specification module 204 specifies a first application link that corresponds to a first call back Uniform Resource Locator (URL) and a second application link that corresponds to a second call back URL. In some embodiments, the application link and call back URL specification module 204 specifies the first application link that corresponds to the first call back URL for a first application type and the second application link that corresponds to the second call back URL for a second application type. In some embodiments, the application link and call back URL specification module 204 specifies a null value that corresponds to a third call back URL if the user application 104A is being accessed from a browser in at least one of (i) the first user device 104 associated with the user 102 or (ii) the second user device 106 associated with the user 102.

The application link and call back URL registration module 202 registers the first application link that corresponds to the first call back URL and the second application link that corresponds to the second call back URL in the table 112 accessible to the credential access application server 110. The credential access application server 110 stores the table 112 in a database 218. In some embodiments, the application link and call back URL registration module 202 registers the first application link that corresponds to the first call back URL for the first application type and the second application link that corresponds to the second call back URL for the second application type in the table 112. In some embodiments, the table 112 includes one or more call back URLs that corresponds to one or more application links. In some embodiments, the table 112 includes the one or more application links that corresponds to the one or more call back URLs.

The credential access communication module 206 obtains a request to access a credential from the user 102 at the user application 104A. The API call module 208 makes an API call that includes (i) the at least one credential that corresponds to the request from the user 102 at the user application 104A and (ii) the call back URL that is specified by the user application 104A. In some embodiments, the user application 104A makes the API call based on an authentication protocol layered on an authorization protocol.

The application link retrieve module 210 retrieves at least one of (i) a target application link or (ii) a null value from the table 112. The target application link or the null value corresponds to the call back URL.

In some embodiments, the credential access application 104B sends the credential access request from the user 102 to the credential access application server 110.

The user verification module 214 verifies at least one of a biometric or a Personal Identification Number (PIN) code by comparing the at least one of the biometric or the PIN code with at least one of a previously registered biometric associated with the user 102 or a previously registered PIN code associated with the user 102 that is stored in the credential access application server 110, and if the at least one of the biometric or the PIN code matches the at least one of the previously registered biometric associated with the user 102 or the previously registered PIN code associated with the user 102, the user private key is made available for executing at least one cryptographic operation. In some embodiments, the biometric of the user 102 may include: (i) a fingerprint scan of the user 102; (ii) a facial feature scan of the user 102; (iii) an iris scan of the user 102; and/or a retina scan of the user 102.

The application link invoke module 216 conditionally invokes the application link from the table to automatically redirect from the credential access application 104B to a target application specified in the target application link. In some embodiments, the target application specified in the target application link is the user application 104A.

In some embodiments, the application link invoke module 216 not redirected to the user application 104A when the user application 104A is being accessed from a browser in at least one of (i) the first user device 104 associated with the user 102 or (ii) the second user device 106 associated with the user 102. In some embodiments, the application link invoke module 216 not redirected to the user application 104A when the user application 104A is being accessed from the second user device 106 associated with the user 102.

Figure 3:
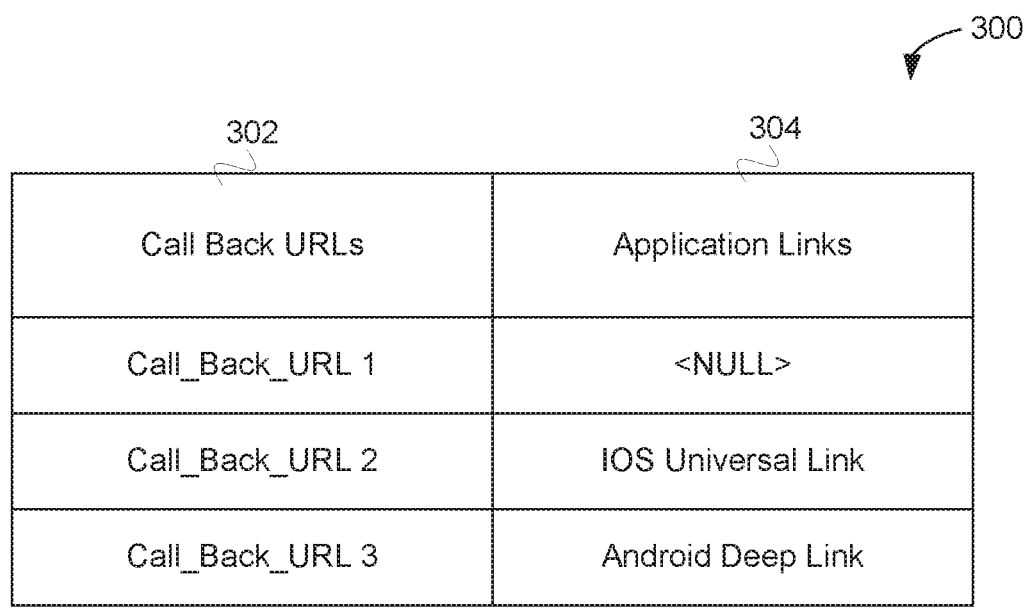
FIG. 3 is a diagram illustrating an embodiment of a table 300 having a mapping that is stored in the database 218 of the credential access application server 110 of FIG. 1.

FIG. 3 is a diagram illustrating an embodiment of a table 300 having a mapping that is stored in the database 218 of the credential access application server 110 of FIG. 1, according to some embodiments herein. In some embodiments, table 300 comprises table 112 of FIG. 1. The table 300 includes a mapping between (i) call back URLs 302 and (ii) application links 304. The call back URLs 302 include a call back URL 1, a call back URL 2 and a call back URL 3. The application links 304 include a null value, an iOS Universal Link and an Android Deep Link. In some embodiments, the user application 104A specifies the null value that corresponds the call back URL 1 in the table 300 if the user application 104A is being accessed from a browser in at least one of: (i) the first user device 104 associated with the user 102 or (ii) the second user device 106 associated with the user 102. In some embodiments, when the user 102 opens a web page which is matched as described, iOS automatically redirects the user 102 to the application. In some embodiments, the Android Deep Link is based on website URL that has been verified to belong to a website. In some embodiments, the Android Deep Link opens the application if the user 102 clicks the URL. The credential access application 104B retrieves at least one of (i) an application link, e.g., the iOS Universal Link or the Android Deep Link or (ii) the null value from the table 300 that corresponds to a call back URL (e.g., the call back URL 1, the call back URL 2 or the call back URL 3). The user application 104A creates a 1-1 mapping for each application link and the corresponding call back URL. In some embodiments, the user application 104A creates the 1-1 mapping for the call back URL and the corresponding application link.

FIG. 4 is a diagram illustrating an embodiment of a table 400 having application links 406 that correspond to call back URLs 404 for application types according to some embodiments herein. In some embodiments, table 400 of FIG. 4 comprises table 112 of FIG. 1. In some embodiments, a user application 402 (e.g., Expedia) includes one or more application types (e.g., a first application type and a second application type). In one example, the user application 402 may be a travel application like Expedia, and the first application type may be an asset owner application that enables owners of hotels to list rooms that are available, and the second application type may be a room booking application that enables guests (e.g., the user 102 to book one or more rooms). In some embodiments, the table 400 includes a first application link that corresponds to a first call back URL for the first application type and a second application link that corresponds to a second call back URL for the second application type.

Figure 5:
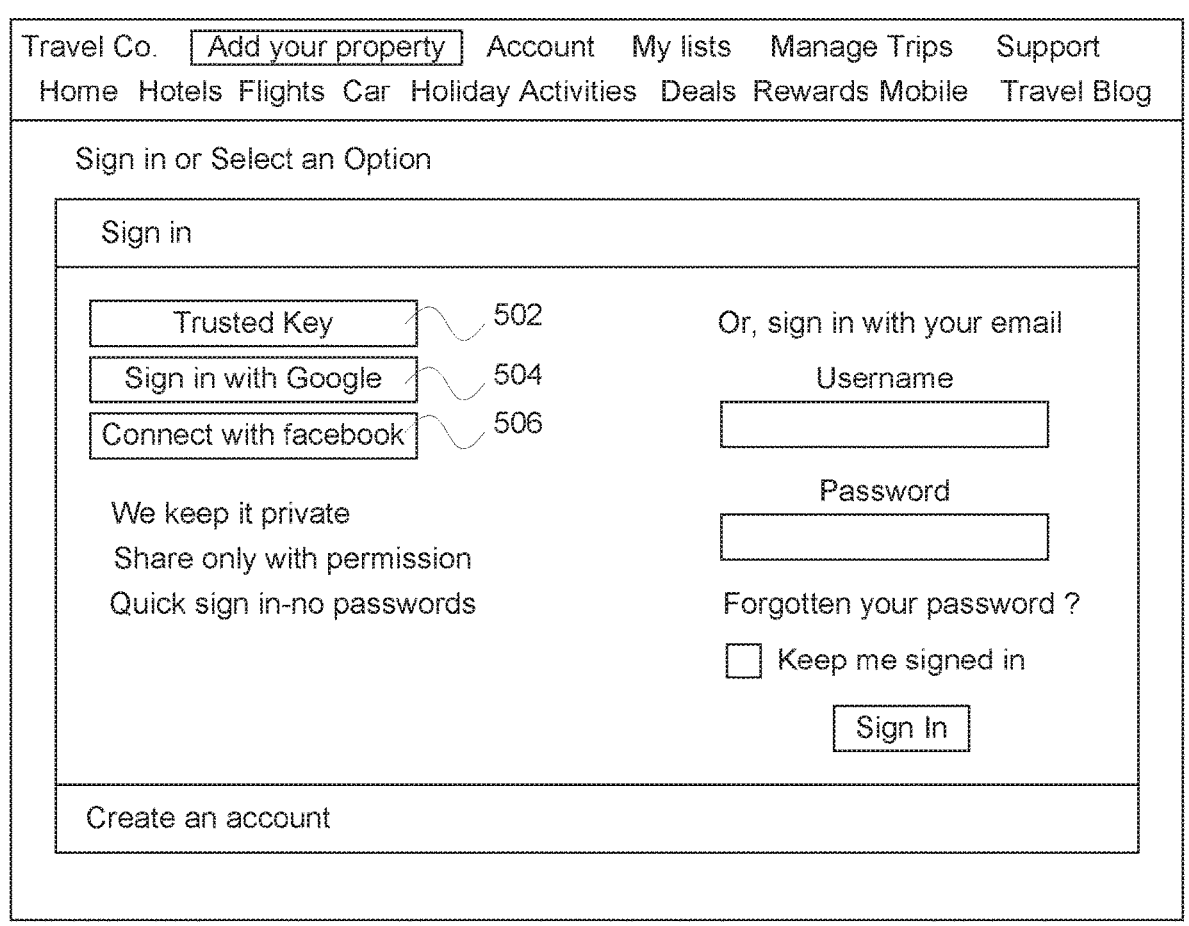
FIG. 5 is a diagram illustrating an embodiment of a screenshot of a user interface 500 of the user application 104A

FIG. 5 is a diagram illustrating an embodiment of a screenshot of a user interface 500 of the user application 104A according to some embodiments herein. The user interface 500 includes the user 102 logging on to the user application 104A (e.g., Expedia) using at least one of: (i) a username and a password; or (ii) the credential access application 104B, which may a Digital Identity Management (DIM) application 502 or a third-party application such as Gmail 504 or Facebook 506. In some embodiments, the user application 104A (e.g., Expedia) includes one or more application types (e.g., a first application type and a second application type). In some embodiments, the first application type may be an asset owner application that enables owners of hotels to login to the user application 104A (e.g., Expedia). In some embodiments, the second application type may be a room booking application that enables the user 102 to login to the user application 104A (e.g., Expedia). In some embodiments, the user 102 enters his/her username and password corresponding to an account which is previously created or registered by the user 102 at the user application 104A, (e.g., Expedia to book hotel rooms, flight tickets, etc.). In some embodiments, the user 102 clicks the Digital Identity Management (DIM) application 502 if the user 102 wants to login to the user application 104A (e.g., Expedia to book the hotel rooms, the flight tickets, etc.) using the Digital Identity Management (DIM) application 502. In some embodiments, the user 102 clicks the third-party application such as Google Mail (Gmail) 504, or Facebook 506 if the user 102 wants to login to the user application 104A (e.g., Expedia to book the hotel rooms, the flight tickets, etc.) using the third-party application such as Gmail 504 or Facebook 506. The user application 104A (e.g., Expedia) makes an API call that includes credential access request initiated by the user 102. The credential access application server 110 sends an at least one credential request to the credential access application 104B (e.g., the Digital Identity Management (DIM) application). In some embodiments, the user 102 receives the at least one credential request from the credential access application server 110 at a corresponding account of the user 102 at the credential access application 104B (e.g., an account of the user 102 at the Digital Identity Management (DIM) application 502 or an account of the user 102 at the third-party application such as Gmail 504 or Facebook 506, etc.). In some embodiments, the at least one credential request is accepted or denied at the corresponding credential access application. In some embodiments, the user 102 provides a biometric or a PIN code at the credential access application 104B (e.g., the Digital Identity Management (DIM) application 502). In some embodiments, the credential access application 104B allows access to the user 102 by verifying the biometric or the PIN code with a previously registered biometric associated with the user 102 or a previously registered PIN code associated with the user 102. In some embodiments, the credential access application 104B automatically redirects or switches back from the credential access application 104B (e.g., the Digital Identity Management (DIM) application 502) to the user application 104A (e.g., Expedia) once the request to allow access to a credential is accepted or denied at the credential access application 104B.

Figure 6:
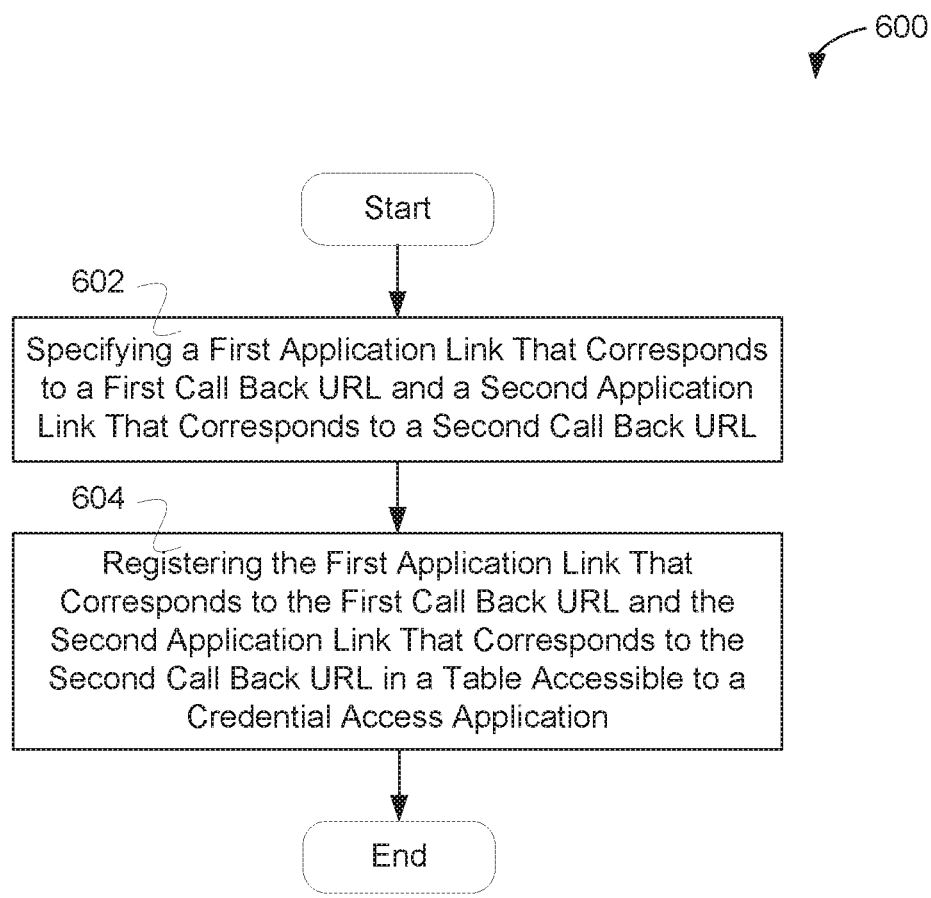
FIG. 6 is a flow diagram illustrating an embodiment of a method 600 for registering a target application with the credential access application 104B to enable automatically redirecting from the credential access application 104B.

FIG. 6 is a flow diagram illustrating an embodiment of a method 600 for registering a target application with the credential access application 104B to enable automatically redirecting from the credential access application 104B according to some embodiments herein. At step 602, the method 600 includes specifying a first application link that corresponds to a first call back URL and a second application link that corresponds to a second call back URL. At step 604, the method 600 incudes registering the first application link that corresponds to the first call back URL and the second application link that corresponds to the second call back URL in the table 112 accessible to the credential access application 104B.

Figure 7:
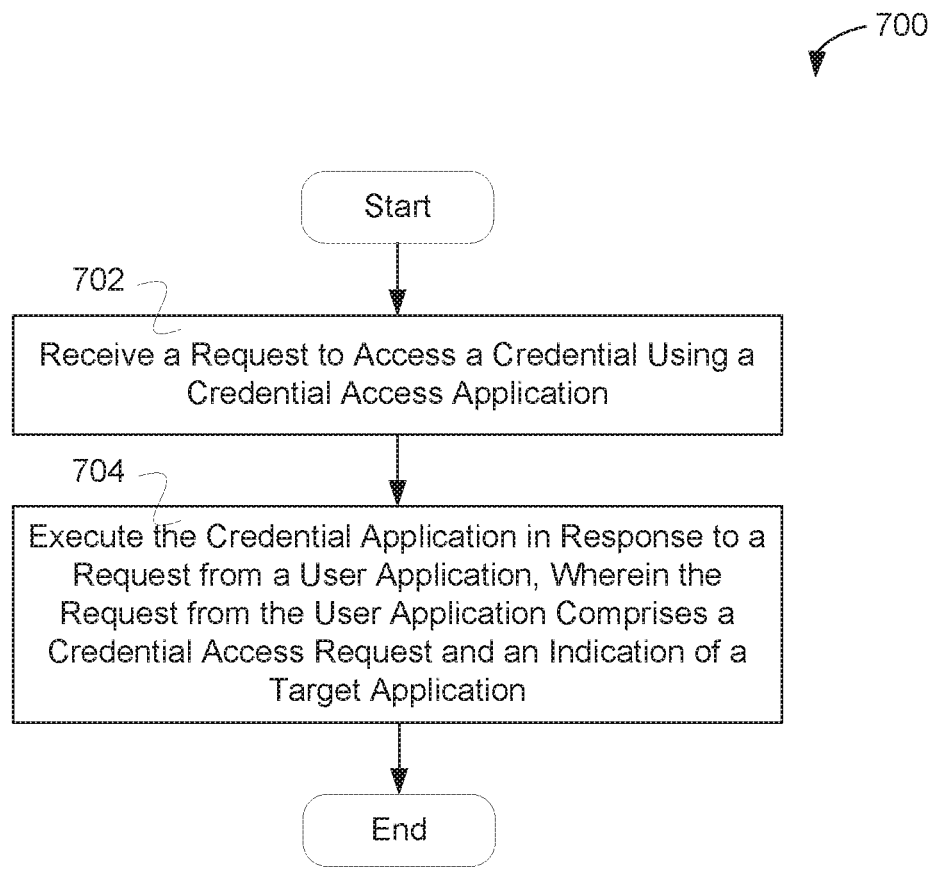
FIG. 7 is a flow diagram illustrating an embodiment of a method 700 for authenticating the user 102 at the user application 104A using the credential access application 104B and automatically redirecting from the credential access application 104B to a target application.

FIG. 7 is a flow diagram illustrating an embodiment of a process for a credential access system. In some embodiments, the process of FIG. 7 is executed by a user device (e.g., first user device 104 of FIG. 1 or second user device 106 of FIG. 1). In the example shown, in 702 a request is received to access a credential using a credential access application. In some embodiments, the credential request comprises receiving a pseudorandom value to be used in a cryptographic operation to verify the user and/or the request. In 704, the credential access application is executed in response to a request from a user application, wherein the request from the user application comprises a credential access request and an indication of a target application.

Figure 8:
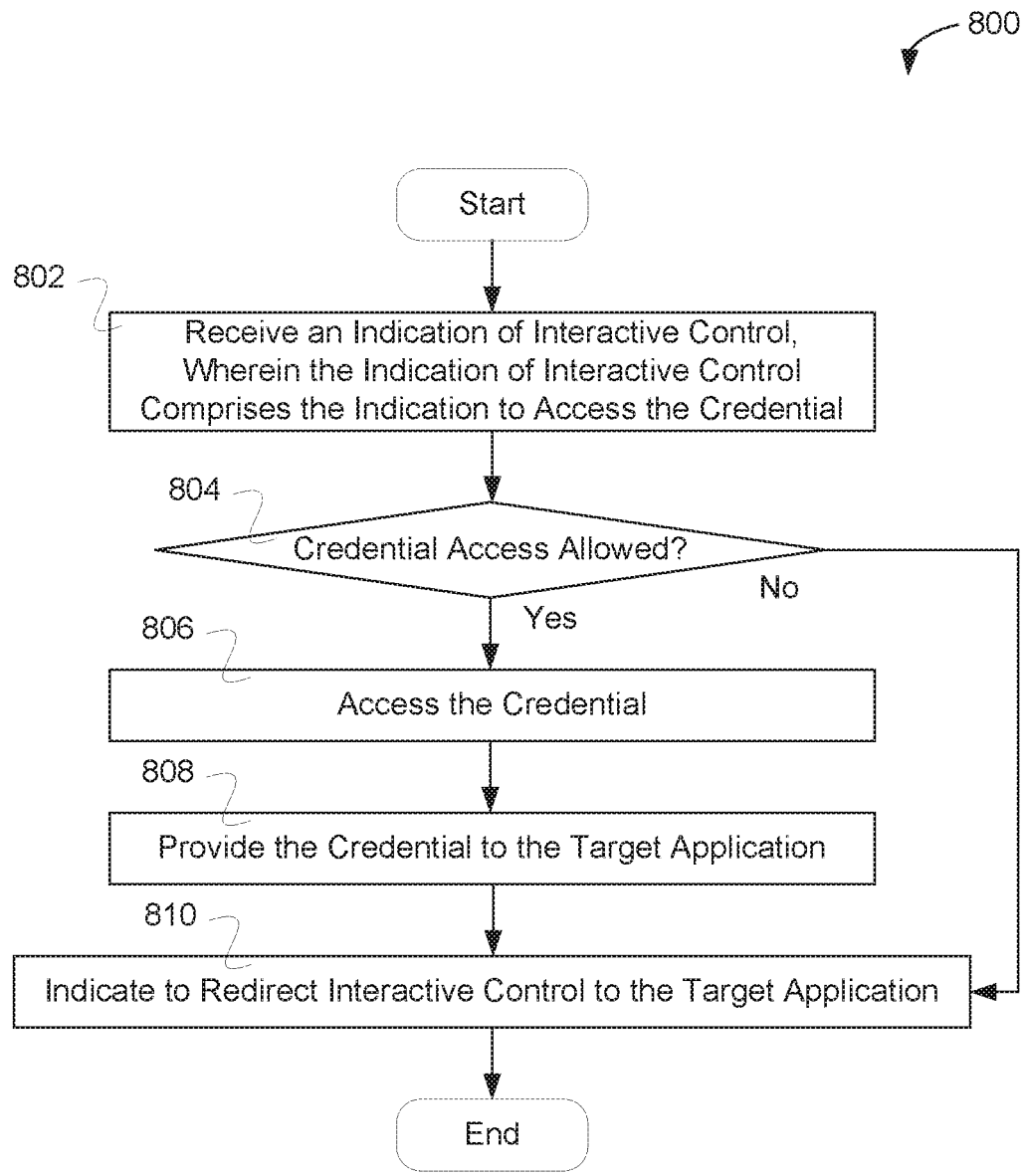
FIG. 8 is a flow diagram illustrating an embodiment of a method for conditionally authenticating the user 102 at the credential access application 104B.

FIG. 8 is a flow diagram illustrating an embodiment of a process for a credential access system. In some embodiments, the process of FIG. 8 is used to implement 704 of FIG. 7. In the example shown, in 802 an indication is received of interactive control, wherein the indication of interactive control comprises the indication to access the credential. In 804, it is determined whether credential access is allowed. In response to determining to allow credential access, control passes to 806. For example, credential access is allowed based at least in part on a username and a password of user being verified, on a PIN code or Biometric of a user being verified, or any other appropriate manner of allowing access. In response to determining not to allow credential access, control passes to 810. In 806, the credential is accessed. For example, the credential is access from a secure storage (e.g., a hardware secure storage location) in the user device (e.g., a mobile device). In 808, the credential is provided to the target application. In 810, it is indicated to redirect interactive control to the target application, and the process ends. For example, the user is provided with a target application link (e.g., a link specific to an operating system—for example, an IOS or Android call enabling transfer of interactive control to a target application). In some embodiments, the credential is used by the target application for access authorization or for verification of information or access to specific information.

In some embodiments, the redirection of interactive control is not performed in the event that access to the credential is not allowed.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
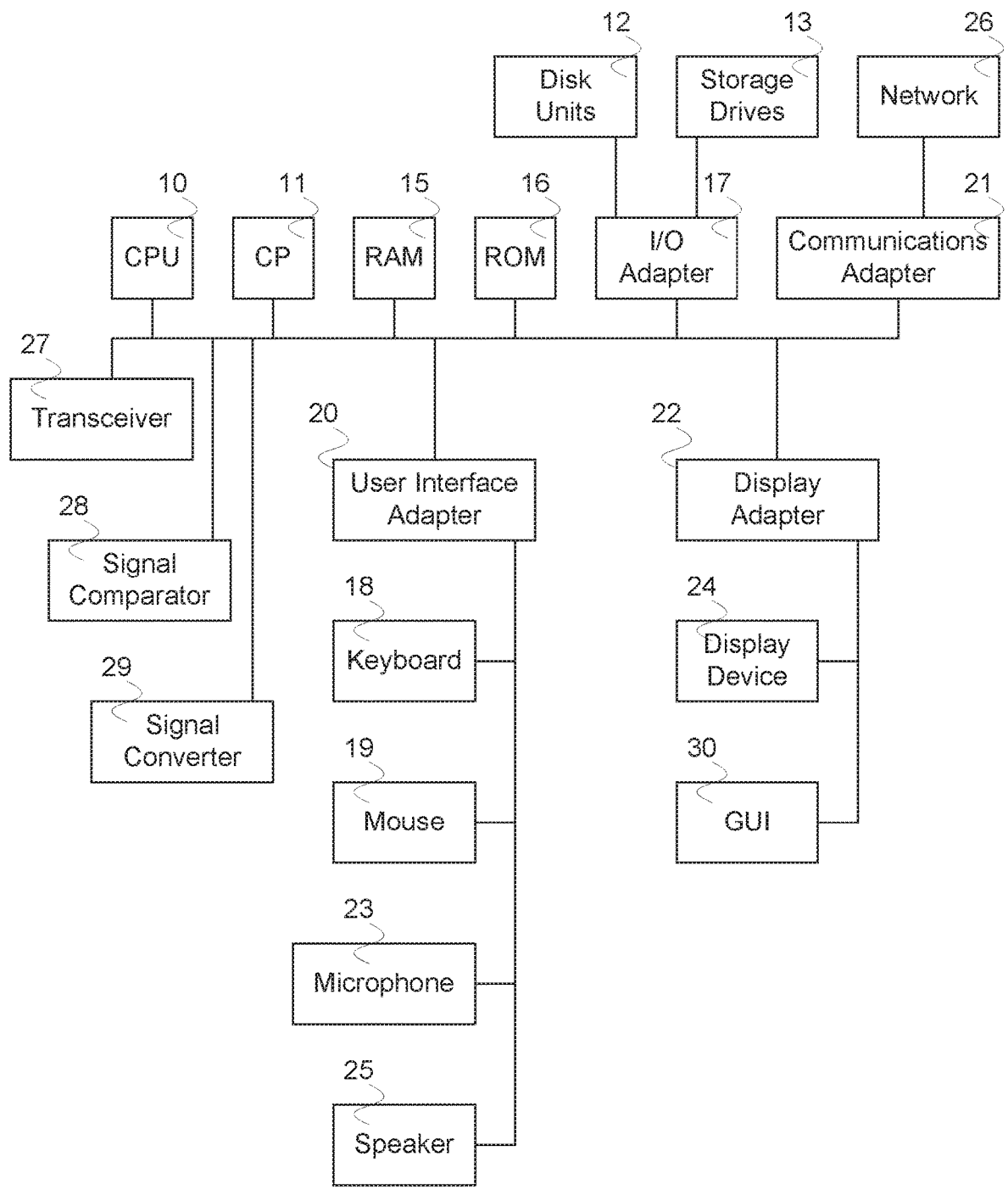
FIG. 9 is a diagram illustrating an embodiment of a hardware configuration of a server/computer system/user device.

A representative hardware environment for practicing the embodiments herein is depicted in FIG. 9, with reference to FIGS. 1 through 8. FIG. 9 is a diagram illustrating an embodiment of a hardware configuration of a server/computer system/user device in accordance with the embodiments herein. The server includes at least one processing device (CPU 10). The server also includes special-purpose processors (CPs 11) that are interconnected via system bus to various devices such as a random access memory (RAM) 15, read-only memory (ROM) 16, and an input/output (I/O) adapter 17. The I/O adapter 17 can connect to peripheral devices, such as disk units 12 and storage drives 13, or other program storage devices that are readable by the system. The server can read the inventive instructions on the program storage devices and follow these instructions to execute the methodology of the embodiments herein. The server further includes a user interface adapter 20 that connects a keyboard 18, mouse 19, speaker 25, microphone 23, and/or other user interface devices such as a touch screen device (not shown) to the bus to gather user input. Additionally, a communication adapter 21 connects the bus to a data processing network 26, and a display adapter 22 connects the bus to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus for processing, transmission, receipt, comparison, and conversion of electric or electronic signals.

Figure 10:
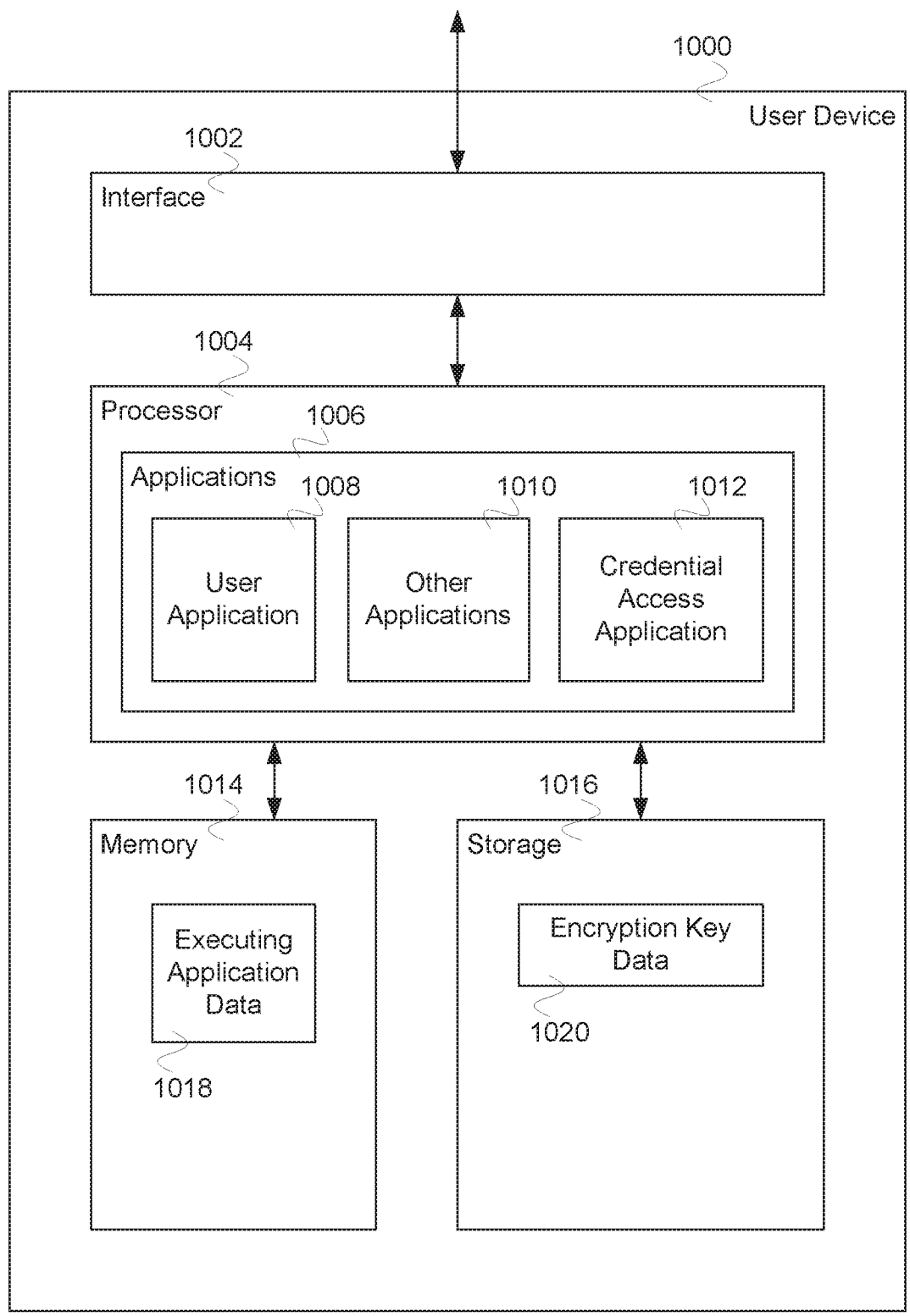
FIG. 10 is a block diagram illustrating an embodiment of a user device.

FIG. 10 is a block diagram illustrating an embodiment of a user device. For example, user device 1000 comprises first user device 104 of FIG. 1 or second user device 106 of FIG. 1. In the example shown, user device 1000 comprises interface 1002. Interface 1002 comprises an interface to processor 1004. For example, interface 1002 comprises an interface for receiving user interactions, providing user interface data, communicating with other systems, receiving a request to access using an authentication application, etc. Processor 1004 comprises a processor for processing data. Processor 1004 executes applications 1006. Applications 1006 comprise user applications 1008, other applications 1010, and credential access applications 1012. For example, processor 1004 grants a selected application of applications 1006 interactive control (e.g., provides output from the selected application for display, grants the selected application access to user input devices, provides primary processor focus to the selected application, etc.). Applications 1006 comprise an application for use by a user, for example, a banking application, a gaming application, a web browser application, etc. For example, applications 1006 comprise an application requiring authentication (e.g., authenticating by proving identity or biographical information). Processor 1004 grants interactive control to applications 1006 (e.g., in response to a user indication to execute applications 1006). A user provides a request to applications 1006 (e.g., via interface 1002) to authenticate using an credential access application (e.g., credential access application 1012). Applications 1006 provide a request for authentication that includes an indication of a target application. The target application comprises a destination application for interactive control redirect after authentication. For example, the target application comprises the user application or an application of other applications 1006.

In response to the request to authenticate, processor 1004 redirects interactive control from an application of applications 1006 to credential access application 1012 and provides an indication of interactive control to applications 1006. The indication of interactive control additionally comprises the indication to authenticate. Credential access application 1012 receives the indication of interactive control comprising the indication to authenticate, authenticates the user, and in the event the user is authenticated indicates to redirect interactive control to the target application. Other applications 1010 comprises any other appropriate applications, for example, a document processing application, a chat application, a social media application, a web browser application, etc. Storage 1016 comprises encryption key data 1020 (e.g., a private encryption key, a public encryption key, a recovery encryption key, a local encryption key, an identifier document key, etc.). Memory 1014 comprises executing application data 1018 comprising data associated with applications 1006.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A credential accessing system, comprising:
an interface configured to receive a request to access a credential using a credential access application; and
a processor configured to:
execute the credential access application in response to a user application request, wherein the request from the user application comprises an indication of a target application, wherein executing the credential access application comprises to:
receive an indication of interactive control, wherein interactive control is redirected from the user application, and wherein the indication of interactive control comprises the indication to access the credential;
determine whether to allow access to the credential; and
in response to determining to allow access to the credential:
access the credential; and
provide the credential to the target application; and
indicate to redirect interactive control to the target application, comprising to:
determine a target application type of the target application;
determine a target application link based on a first target application type or a second target application type; and conditionally invoke the target application link to automatically redirect from the credential access application to the target application specified in the target application link.

2. The system of claim 1, wherein the target application link is at least one of an iOS Universal Link in the event the target application is an iOS application, or an Android Deep Link in the event the target application is an Android application.

3. The system of claim 1, wherein the request from the user application further comprises at least one proof request that corresponds to a credential request from the user using the user application.

4. The system of claim 1, wherein allowing access to the credential is based at least in part on a username and a password of the user.

5. The system of claim 1, wherein allowing access to the credential is based at least in part on:
verifying at least one of a biometric or a PIN code by comparing the at least one of the biometric or the PIN code with at least one of a previously registered biometric associated with a user or a previously registered PIN code associated with the user, and in the event the at least one of the biometric or the PIN code matches the at least one of the previously registered biometric associated with the user or the previously registered PIN code associated with the user, making a user private key available for executing a cryptographic operation.

6. The system of claim 5, wherein the cryptographic operation uses the user private key to access the credential.

7. The system of claim 6, wherein receiving a credential access request comprises receiving a pseudorandom value and decrypting the credential with the user private key.

8. The system of claim 1, wherein the target application comprises the user application.

9. A method for credential accessing, comprising:
receiving a request to access a credential using a credential access application; and
executing, using a processor, the credential access application in response to a user application request, wherein the request from the user application comprises an indication of a target application, wherein executing the credential access application comprises:
receiving an indication of interactive control, wherein interactive control is redirected from the user application, and wherein the indication of interactive control comprises the indication to access the credential;
determining whether to allow access to the credential; and
in response to determining to allow access to the credential:
access accessing the credential; and
providing the credential to the target application; and
indicate to redirect interactive control to the target application, comprising:
determining a target application type of the target application;
determining a target application link based on a first target application type or a second target application type; and
conditionally invoking the target application link to automatically redirect from the credential access application to the target application specified in the target application link.

10. The method of claim 9, wherein the target application link is at least one of an iOS Universal Link in the event the target application is an iOS application or an Android Deep Link in the event the target application is an Android application.

11. The method of claim 9, wherein the request from the user application further comprises at least one proof request that corresponds to a credential request from the user using the user application.

12. The method of claim 9, wherein allowing access to the credential is based at least in part on a username and a password of the user.

13. The method of claim 9, wherein allowing access to the credential is based at least in part on:
verifying at least one of a biometric or a PIN code by comparing the at least one of the biometric or the PIN code with at least one of a previously registered biometric associated with a user or a previously registered PIN code associated with the user, and in the event the at least one of the biometric or the PIN code matches the at least one of the previously registered biometric associated with the user or the previously registered PIN code associated with the user, making a user private key available for executing a cryptographic operation.

14. The method of claim 13, wherein the cryptographic operation uses the user private key to access the credential.

15. The method of claim 14, wherein receiving a credential access request comprises receiving a pseudorandom value and decrypting the credential with the user private key.

16. The method of claim 9, wherein the target application comprises the user application.

17. A computer program product for credential accessing, the computer program product being embodied in a non-transitory computer readable storage medium and comprising computer instructions for, comprising:
receiving a request to access a credential using a credential access application;
executing the credential access application in response to a user application request, wherein the request from the user application comprises an indication of a target application, wherein executing the credential access application comprises:
receiving an indication of interactive control, wherein interactive control is redirected from the user application, and wherein the indication of interactive control comprises the indication to access the credential;
determine whether to allow access to the credential; and
in response to determining to allow access to the credential:
access the credential; and
provide the credential to the target application; and
indicate to redirect interactive control to the target application, comprising:
determining a target application type of the target application;
determining a target application link based on a first target application type or a second target application type; and
conditionally invoking the target application link to automatically redirect from the credential access application to the target application specified in the target application link.

* * * * *